United States Patent [19]

Lam et al.

[11] Patent Number: 5,631,709
[45] Date of Patent: May 20, 1997

[54] METHOD AND APPARATUS FOR PROCESSING A COMPOSITE SYNCHRONIZING SIGNAL

[75] Inventors: Kah H. P. Lam; Luen H. Kwok; Chi M. Lai, all of Hong Kong, Hong Kong

[73] Assignee: Motorola, Inc., Schaumburg, Ill.

[21] Appl. No.: 339,841

[22] Filed: Nov. 15, 1994

[51] Int. Cl.⁶ ............................................. H04N 5/08
[52] U.S. Cl. ............................................. 348/531; 348/529
[58] Field of Search ............................................. 348/525, 526, 348/529, 530, 531, 533, 536, 542, 543, 545, 546, 547, 548, 521, 522, 524, 500; H04N 5/08

[56] References Cited

U.S. PATENT DOCUMENTS

| | | | |
|---|---|---|---|
| 4,122,488 | 10/1978 | Mikado | 348/523 |
| 4,227,214 | 10/1980 | Morito et al. | 348/548 |
| 4,258,389 | 3/1981 | Sakamato | 348/530 |
| 4,535,353 | 8/1985 | Turner | 348/525 |
| 4,535,358 | 8/1985 | Duijkers | 348/542 |
| 4,684,988 | 8/1987 | Johannes | 348/529 |
| 5,003,391 | 3/1991 | Peters et al. | 348/525 |
| 5,303,046 | 4/1994 | Masuda | 348/521 |

*Primary Examiner*—Michael H. Lee
*Attorney, Agent, or Firm*—Robert D. Atkins

[57] ABSTRACT

A pulse separator 110 predicts the start of a vertical synchronizing pulse in a video composite synchronizing signal (VCSS) applied via input 105. At a predicted time, the pulse separator 110 provides a start signal via a first output to the bistable 125, thereby causing a signal at output 130 to vary from a first output level to a second output level. When the end of the vertical synchronizing pulse is detected in the VCSS, a stop signal is provided via a second output to the bistable 125, thereby causing the signal at the output 130 to vary from the second level to the first level. A multiplexer (MUX) 615 switched to couple horizontal synchronizing pulses from input 605 to output 620, when a vertical synchronizing pulse is received from input 625, and, switched to coupled pseudo horizontal synchronizing pulses from pseudo pulse generator 610 to the output 620 when a vertical synchronizing pulse is not received from the input 625.

5 Claims, 4 Drawing Sheets

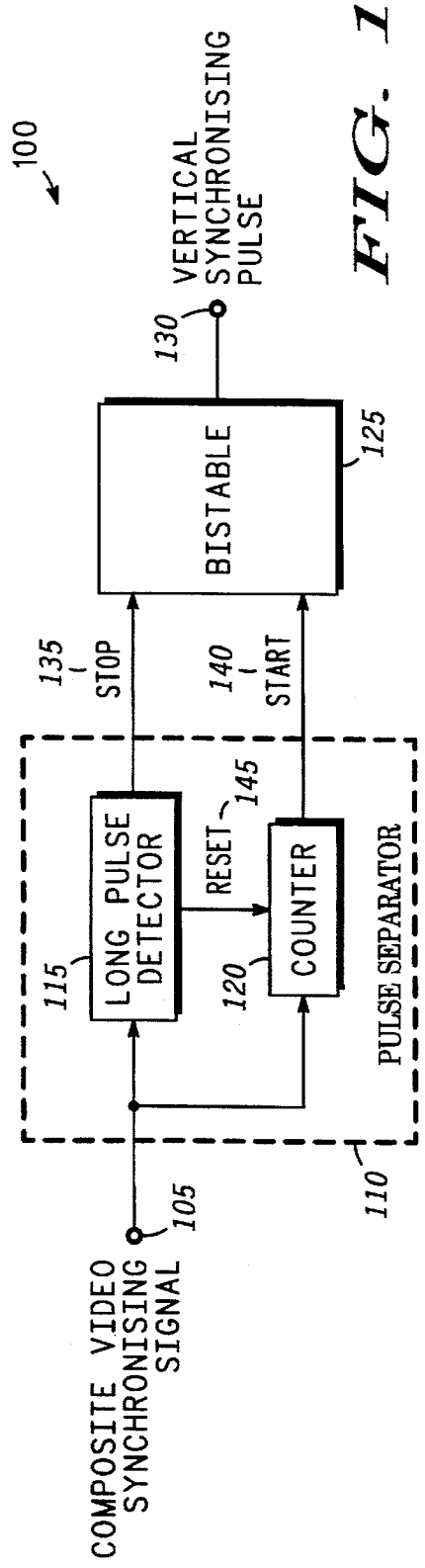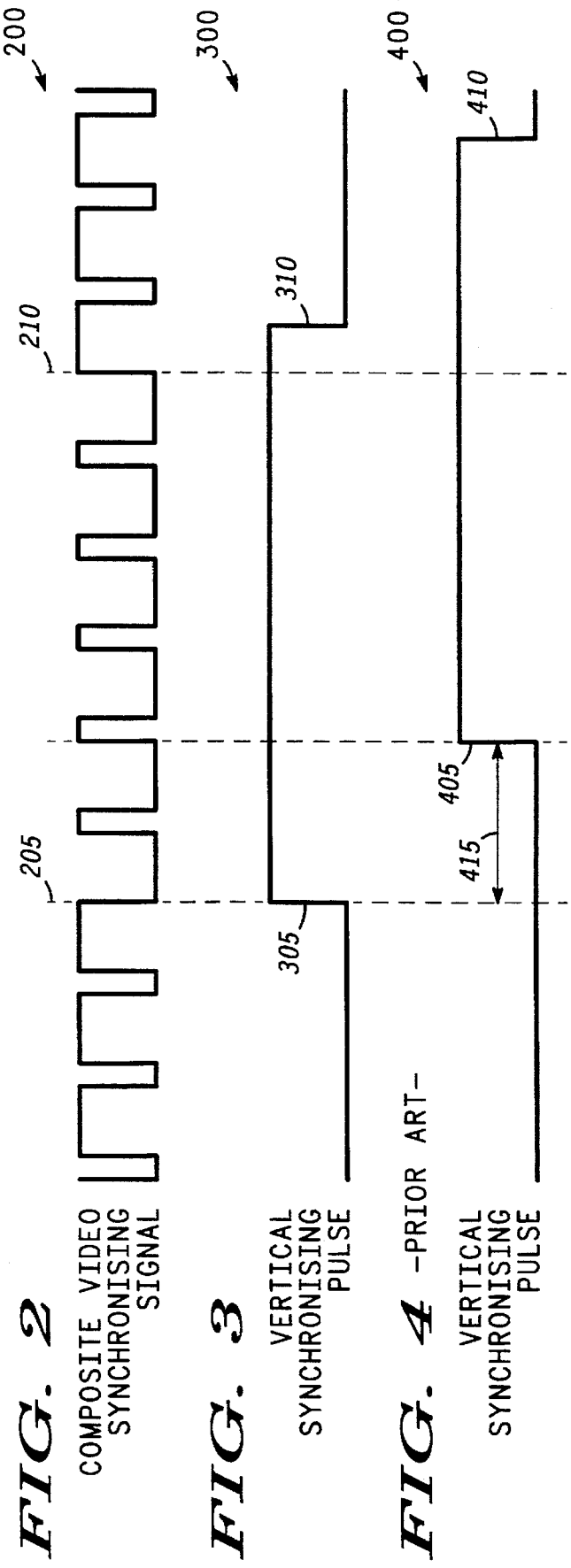

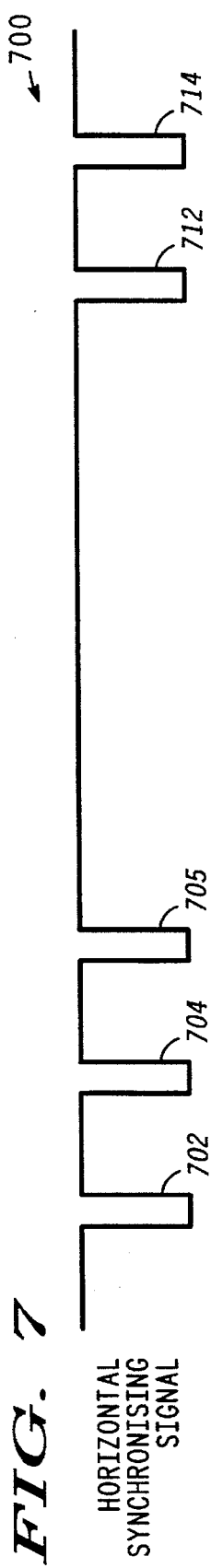
FIG. 7 HORIZONTAL SYNCHRONISING SIGNAL
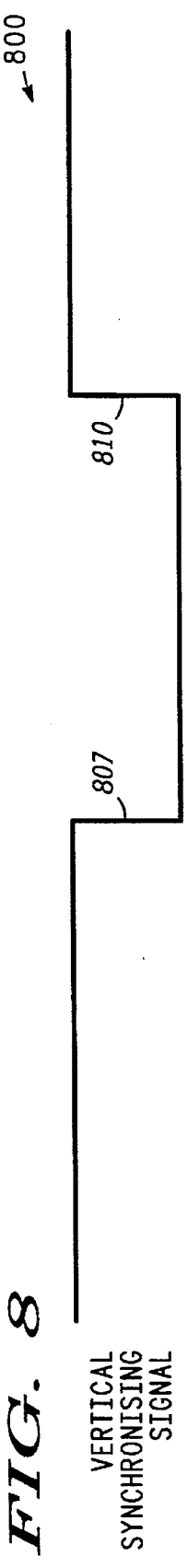
FIG. 8 VERTICAL SYNCHRONISING SIGNAL
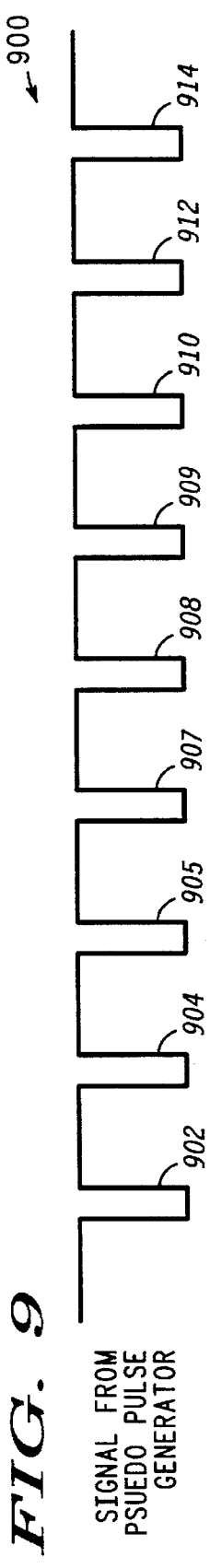
FIG. 9 SIGNAL FROM PSUEDO PULSE GENERATOR
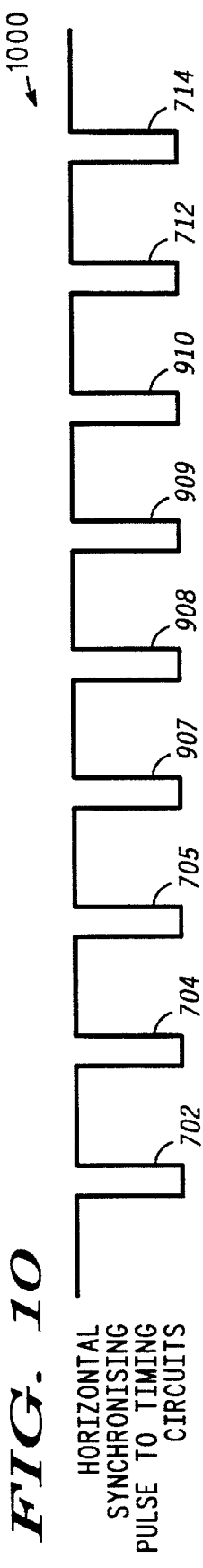
FIG. 10 HORIZONTAL SYNCHRONISING PULSE TO TIMING CIRCUITS

METHOD AND APPARATUS FOR PROCESSING A COMPOSITE SYNCHRONIZING SIGNAL

FIELD OF THE INVENTION

This invention relates in general to composite video synchronising signals, and in particular to a method and apparatus for separating signals in a composite video synchronising signal.

BACKGROUND OF THE INVENTION

Video monitors are well known in the art. Conventionally, a video monitor is coupled to equipment such as a computers and television receivers, which provide a variety of signals to the video monitor in order to obtain a display on the screen of the video monitor. One of these signals is a video composite synchronising signal (VCSS) which comprises a horizontal synchronising signal (HSS), that determines the number of horizontal lines that make up a display on a video monitor, and a vertical synchronising signal (VSS), that determines the frequency at which the display is refreshed. Conventionally, a VCSS has two levels, a first level and a second level, and by switching between these levels at particular instances in time, pulses are produced which convey both the HSS and the VSS. Also, as the duration of a HSS pulse is much shorter than the duration of a VSS pulse, the VCSS can provide the HSS while providing the VSS.

The VCSS provided by equipment that couple to video monitors may vary. For example, a VCSS provided to a video monitor may have a continuos HSS pulses when providing a VSS pulse, alternatively, a VCSS may not provide any HSS pulses when providing a VSS pulse. Generally, video monitors require a continuos sequence of HSS pulses as the absence of these pulses adversely affects timing circuits in the video monitor, thus affecting the display.

When a video monitor receives a VCSS, a conventional method of separating the VSS are extracted from the VCSS is by using an analogue circuit. While this method of separation is well known in the art, it has several disadvantages. One disadvantage is the use of analogue circuitry. Such analogue circuits conventionally utilise bipolar semiconductor devices that consume high power, and are also susceptible to degradation in performance due to variation in operational conditions. In addition, as video monitors use digital control circuitry, yet another disadvantage of this method is the need to interface the analogue circuit with the digital control circuit which limits the degree of circuit integration that may be achieved in a video monitor. Another disadvantage of this method is the delay inherent in the analogue circuitry causing loss of VCSS information. Typically, the loss may be one or more HSS pulses which adversely affects the timing circuitry. Yet another disadvantage of this method is the inability to process a VCSS that does not provide HSS pulses when providing a VSS pulse, which results in loss of information and adversely affecting the timing circuits.

Hence, a need exists for a method of processing a VCSS in a video monitor that separates the VSS without loss of information and preferably without employing analogue circuitry. In addition, the method should avoid adversely affecting timing circuits in the video monitor when a VCSS does not provide HSS pulses when providing a VSS pulse.

SUMMARY OF THE INVENTION

In carrying out the objects of the present invention in one form, there is provided a method and apparatus for separating a vertical synchronising signal from a video composite synchronising signal.

In carrying out the objects of the present invention in another form, there is provided a method and apparatus for providing pseudo horizontal synchronising pulses when providing a vertical synchronising pulse.

BRIEF DESCRIPTION OF THE DRAWING

FIG. 1 illustrates a functional block diagram of a circuit in accordance with a preferred embodiment of the present invention.

FIGS. 2, 3 and 4 illustrate timing diagrams of the circuit in FIG. 1 in accordance with the preferred embodiment of the present invention.

FIGS. 7, 8, 9 and 10 illustrate timing diagrams of the circuit in FIG. 6 in accordance with the preferred embodiment of the present invention.

DETAILED DESCRIPTION OF THE INVENTION

Figure 5:
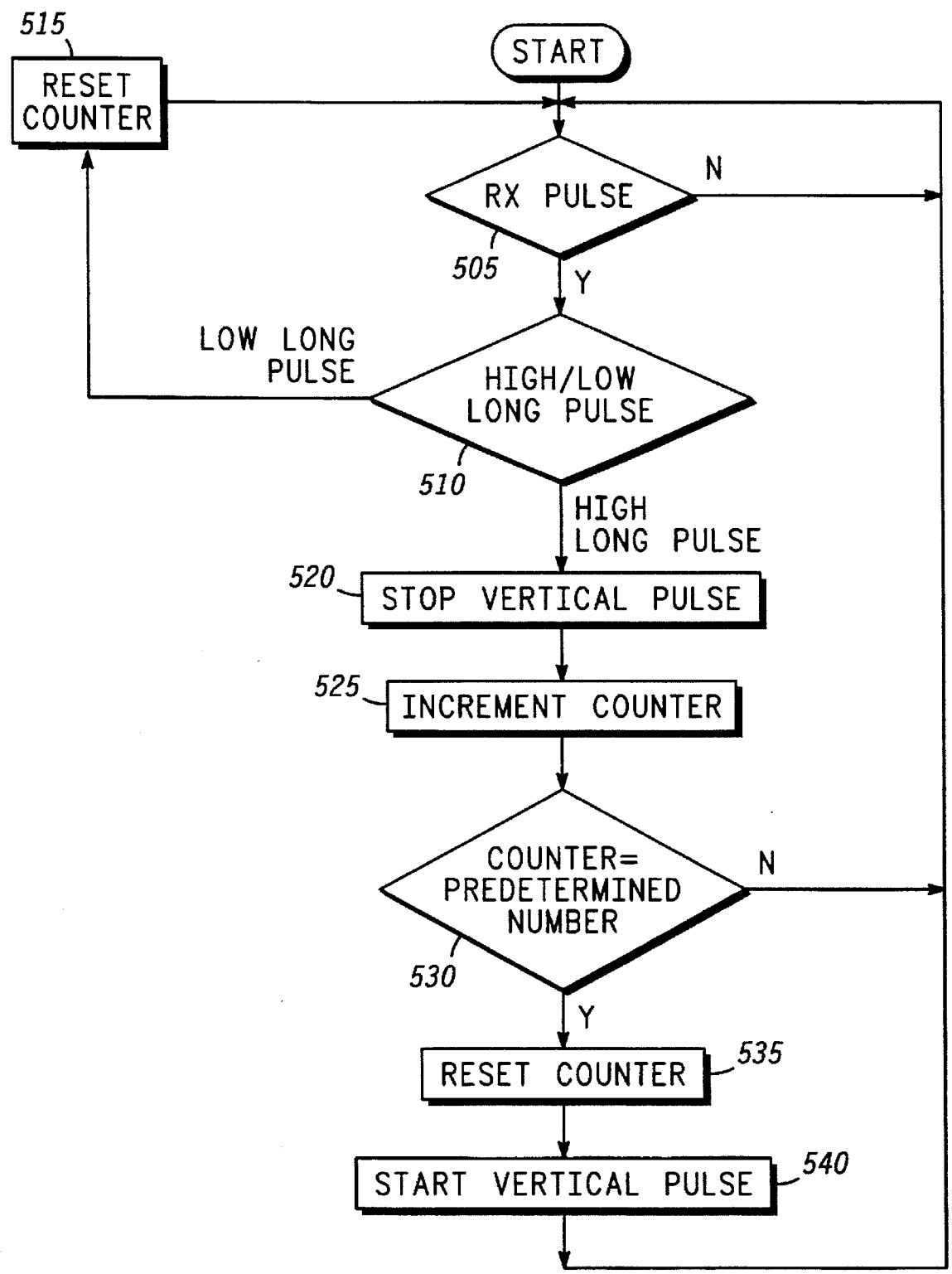
FIG. 5 illustrates a flowchart detailing the operation of the circuit in FIG. 1 in accordance with the preferred embodiment of the present invention.

FIG. 1 illustrates a functional block diagram of a circuit 100 that may be used in a video monitor for separating a predetermined pulse from within a signal. The predetermined pulse may, for example, be a vertical synchronising pulse, and the signal may, for example, be a video composite synchronising signal (VCSS). The circuit 100 comprises a pulse separator 110 and a bistable 125. The pulse separator 110 is coupled to input 105 and has a first output and a second output coupled to the bistable 125. The pulse separator 110 receives a VCSS from the input 105 and provides a start signal 140 from the first output to the bistable 125 in response to determining the start of a vertical synchronising pulse from the VCSS, and in addition, the pulse separator 110 provides a stop signal 135 from the second output to the bistable 125 in response to detecting the conclusion of a vertical synchronising pulse from the VCSS. The pulse separator 110 may also provide the start signal 140 in response to determining the start of a predetermined signal from within a signal, may also provide the stop signal 135 in response to detecting the conclusion of a predetermined pulse from within a signal. The bistable 125 receives the start signal 140, and the stop signal 135 from the pulse separator 110, and is coupled to an output 130 for providing an output signal having a first level and a second level. The bistable 125, which may be a level provider, varies the output signal from the first level to the second level, in response to receiving the start signal 140 from the pulse separator 110, thereby, regenerating the start of a vertical synchronising pulse. The bistable may also vary the output signal from the second level to the first level, in response to receiving the stop signal 135 from the pulse separator 110, thereby regenerating the conclusion of a vertical synchronising pulse. The bistable 125 may be a digital electronic component commonly known in the art as a set-reset flip-flop having two inputs and an output 130, where applying a signal to one of the inputs sets the output signal from a first output level to second output level, and applying a signal to the other input resets the output signal from the second output level back to the first output level. The circuit 100 may comprise a digital electronic circuit fabricated using semiconductor technology which may include high speed complementary metal oxide semiconductor (HCMOS).

The VCSS, conventionally, comprises a signal having a high and a low level that conveys vertical and horizontal synchronising information by pulsing between a high and a low level. For example, when the duration a pulse of the VCSS is at the low level is greater than a predetermined duration, the pulse may convey vertical synchronising information and may be defined as a low long pulse (LLP). Alternatively, when the duration a pulse of the VCSS is at the high level is greater than a predetermined duration, the pulse may convey horizontal synchronising information and may be defined as a high long pulse (HLP).

The pulse separator 110 comprises a long pulse detector 115 and a counter 120. The long pulse detector 115 has an input and two outputs. The input of the long pulse detector 115 is coupled to the input 105, and receives the VCSS from the input 105. One output of the long pulse detector 115 is coupled to a counter 120, while another output of the long pulse detector 115 provides the stop signal 135 to the bistable 125 via the second output of the pulse separator 110. The long pulse detector 115 provides the stop signal 135 when a HLP is detected, and when a LLP is detected, the long pulse detector 115 provides a reset signal 145 to the counter 120. The long pulse detector 115 may determine a pulse in the VCSS is a valid LLP when the pulse in the VCSS is a horizontal synchronising pulse. Alternatively, the long pulse detector 115 may determine a pulse in the VCSS is invalid when the pulse in the VCSS is a vertical synchronising pulse. The long pulse detector 115 may also determine a pulse in the VCSS is invalid when the pulse in the VCSS is not a horizontal synchronising pulse.

The counter 120 has two inputs and an output. One input of the counter 120 is coupled to receive the VCSS from the input 105, while another input is coupled to receive the reset signal from the pulse detector 115. The output of the counter 120 is coupled to provide the start signal 140 to the bistable 125 via the first output to the bistable 125, when a predetermined number of horizontal synchronising pulses are counted prior to receiving the reset signal 145 from the long pulse detector 115.

The counter 120 may be a digital electronic counter that counts to a predetermined number and provides a start signal to the bistable 125 on counting to the predetermined number prior to receiving a reset signal. The reset signal 145 resets the counter to a predetermined reference, where typically the predetermined reference is zero. In addition, the counter 120 may also be coupled with a register, such that the register stores the predetermined number. The counter 120 and the register may be coupled with a comparator, such that the contents of the counter 120 is compared with the contents of the register. When the contents are substantially similar, the start signal 140 may be provided by the comparator, the contents of the counter may be transferred into the register, and the counter may then be reset. In this way the predetermined number in the register is dynamically updated prior to the occurrence of each vertical synchronising pulse, hence, allowing the predetermined number in the register to be ascertained from the number of horizontal pulses within a CVSS. As the contents of the register reflect the number of horizontal lines on a display, the contents of the register may be utilised by other functions in the video monitor. For example, the contents of the register may be utilised to determine the display mode of the CVSS provided to the video monitor.

Hence, this method of dynamically setting the predetermined number advantageously enables a video monitor to automatically support a variety of CVSS having different horizontal synchronising signal frequencies, thereby supporting multi-mode operation. As a result a user may use a video monitor with a variety of CVSS sources, such as a variety of computers, without being encumbered with the difficulty and complexity of ensuring compatibility.

FIGS. 2, 3 and 4 illustrate timing diagrams, commonly referred to as waveforms. The waveforms 200, 300 and 400, are shown over a period of time, where each waveform has a first and a second level. The waveform 200 represents a typical VCSS applied to the input 105, while the waveform 300 represents the signal at the output 130. The waveform 200 comprises a sequence of HLPs which convey horizontal synchronising pulses to time 205. This is followed by a sequence of LLPs from time 205 to a later time 210 which convey a vertical synchronising pulse, and HLPs from time 210 conveying horizontal synchronising pulses. The waveform 300 comprises a vertical synchronising pulse which starts with a rising edge 305 that occurs at time 205 when the vertical synchronising pulse starts, and ends with a falling edge 310 which typically occurs when the long pulse detector 115 determines that the first pulse, immediately after 210, is a high long pulse. This determination by the long pulse detector may take a finite duration as explained earlier, causing the falling edge 310 to occur sometime after the high long pulse occurs at 210. The waveform 400 represents a vertical synchronising pulse separated from the VCSS, represented by waveform 200, when using prior art methods and apparatus. The waveform 400 comprises a rising edge 405 and a falling edge 410. The rising edge 405 occurs after a significant delay 415 after time 205, and the falling edge 410 is similarly delayed. In extreme instances, horizontal synchronising information amounting to one or more pulses may be lost during the delay 415.

With particular reference to the flowchart in FIG. 5, and with reference to FIGS. 1 through 4, the operation of the preferred embodiment of the present invention follows.

At the long pulse counter 115, a determination is continuously made to indicate when a pulse has been received 505. When no pulses are received 505, the process continues to wait for a pulse, however, when the signal 200 is applied to the input 105 and a determination is made that a pulse is received 505, a further determination is made to identify 510 whether the pulse is a high long pulse (HLP) or a low long pulse (LLP). When the pulse is a LLP, the counter 120 is reset 515, typically to zero, and receipt 505 of a next pulse is awaited. However, when the pulse is a HLP, the stop signal 135 is provided to the bistable 125 from the long pulse detector 115 causing the bistable 125 to reset. If the bistable 125 is providing a vertical pulse when the reset occurs, the stop signal 135 causes the bistable to regenerate the conclusion of the vertical pulse and as a result the vertical pulse is stopped 520. Subsequently, the counter 120 is incremented 525, typically by one count. Next, when a determination is made that the counter 120 has not counted 530 to a predetermined number, the process returns to awaiting receipt 505 of a next pulse. Alternatively, when a determination is made that the counter 120 has counted 530 a predetermined number of pulses, the start signal 140 is provided to the bistable 125 from the counter 125 via the first output and a vertical pulse is started at the output 130 of the bistable 125.

Hence, with this method the start of the vertical synchronising pulse is predicted when the predetermined number of pulses are counted, hence, the vertical pulse may be started at a precise point in time indicated in the VCSS, even before the long pulse detector can determine a LLP indicating the start of the vertical synchronising pulse has occurred in the VCSS. This ability to start the vertical synchronising pulse without delay prevents loss of information, typically amounting to one or more horizontal synchronising pulses, thus, providing a significant improvement over previous methods.

Figure 6:
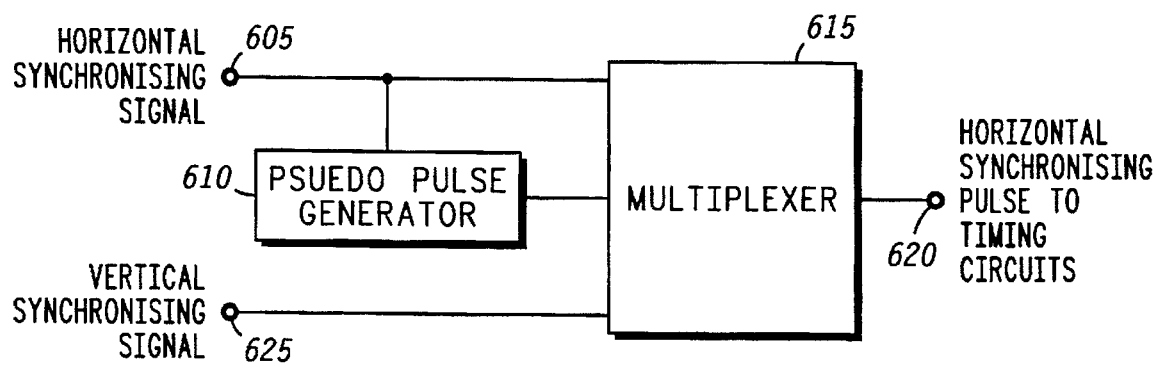
FIG. 6 illustrates a functional block diagram of a circuit in accordance with the preferred embodiment of the present invention.

FIG. 6 illustrates a functional block diagram of a circuit 600 that may be used in a video monitor for providing a sequence of output pulses. The output pulses may be horizontal synchronising pulses similar to that used in a video monitor. The circuit 600 comprises a pseudo pulse generator (PPG) 610 and a multiplexer (MUX) 615. The PPG 610 has an input coupled to receive a first sequence of pulses from the input 605 and an output which provides a second sequence of pulses. The first sequence of pulses may be horizontal synchronising pulses from input 605, and the second sequence of pulses may be a sequence of pseudo horizontal synchronising pulses (PHSPs). The PPG 610 generates the PHSPs from the horizontal synchronising signal. The PPG 610 may generate the pseudo horizontal synchronising pulses by determining the frequency of the horizontal synchronising pulse of the horizontal synchronising signal, and generating pseudo horizontal synchronising pulses at a similar frequency having a predetermined pulse width. Alternatively, the pulse width may also be determined from the received horizontal synchronising signal.

The MUX 615 has three inputs and an output 620. The MUX 615 may be a switch with three inputs and one output, where one input may be a control input, and dependent upon the signal applied to the control input, one of the other two inputs is coupled to the output. A first input of the MUX 615 is coupled to receive the horizontal synchronising signal from the input 605, a second input is coupled to the output of the PPG to receive the PHSPs, and a third input is coupled to receive an indication that the horizontal synchronising signal is terminated. The indication may be provided by a vertical synchronising signal from input 625. In addition, the MUX 615 has an output 620, coupled to provide horizontal synchronising pulses to timing circuits in a video monitor. The vertical synchronising signal provides a control signal, that may be referred to as an input select signal, to the MUX 615. The input select signal determines which input of the MUX 615 is coupled to the output 620. For example, when a vertical synchronising pulse is received via input 625, the MUX 615 couples the output of the PPG 610 to the output 620 for the duration of the vertical synchronising pulse, and when the vertical synchronising pulse concludes, the horizontal synchronising pulses received from the input 605 are coupled to the output 620. The circuit 600 may comprise a digital electronic circuit comprising logic circuits fabricated using semiconductor technology which may include high speed complementary metal oxide semiconductor (HCMOS).

FIGS. 7 though 10 illustrate timing waveforms 700 through 1000 representing various signals over a particular period of time where each signal has a first and a second level. The waveform 700 represents a horizontal synchronising signal that may be applied to the input 605, comprising a sequence of horizontal synchronising pulses 702 through 705, followed by a period without pulses, after which another sequence of pulses 712 and 714 is applied. The waveform 800 represents a vertical synchronising signal that may be applied to the input 625, comprising a vertical synchronising pulse which starts with a falling edge 805 and ends with a rising edge 810. The waveforms 700 and 800 may, for example, be derived from a video composite synchronising signal (VCSS). The waveform 900 represents the pseudo horizontal synchronising signal that may be provided from the output of the pseudo pulse generator 610 comprising a sequence of pseudo horizontal synchronising pulses 902 through 914. The pseudo horizontal synchronising pulses 902 through 914, produced by the PPG 610 may be substantially similar to the horizontal synchronising pulses 702 through 705 and 712, 714 provided from the input 605. The waveform 1000 represents a sequence of horizontal synchronising pulses comprising pulses 702 through 705 switched by the MUX 615 from the input 605, pulses 907 through 910 switched by the MUX 615 from the output of the PPG 610, and pulses 712 and 714 switched by MUX 615 from the input 605.

Figure 11:
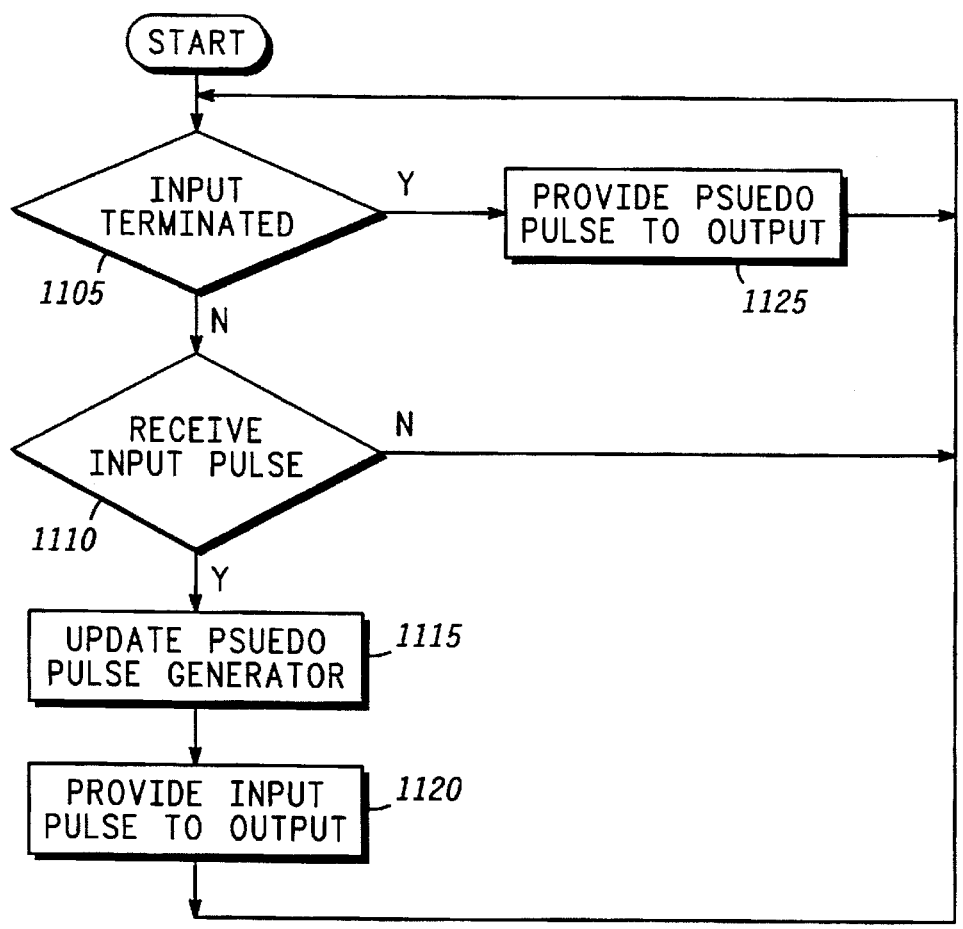
FIG. 11 illustrates a flowchart of the circuit in FIG. 6 in accordance with the preferred embodiment of the present invention.

With particular reference to FIG. 11, and references to FIGS. 7 through 10, the operation of the preferred embodiment of the present invention follows.

Prior to the occurrence of the falling edge 807, the pulses 702 through 705 are coupled by the MUX 615 to the output 620. The occurrence of the falling edge 807 provides an indication to the MUX 615, that the horizontal synchronising signal received from the input 605 is terminated 1105, and consequently, the MUX 615 couples the pseudo horizontal synchronising pulses 907 through 910 to the output 620. Alternatively, when the horizontal synchronising signal is not terminated, a determination is made whether a horizontal synchronising pulse has been received 110 from the input 605. When a pulse is not received the process returns to determining whether the horizontal synchronising signal from the input 605 is terminated 1105. However, when a horizontal synchronising pulse is received 1110, the horizontal synchronising pulse is used to update 1115 the PPG 610 and coupled by the MUX 615 to the output 620, thereby producing the waveform 1000 from the output 620.

Hence, by using the vertical synchronising signal to switch a multiplexer between a horizontal synchronising signal and a pseudo horizontal synchronising signal, a continuos stream of synchronising pulses may be provided to timing circuits in a video monitor, thereby, preventing current designs of timing circuits from operating erroneously, and enabling future timing circuit designs to be significantly simplified.

In accordance with the present invention a vertical synchronising signal may be separated from a video composite synchronising signal by predicting when a vertical synchronising pulse starts, and providing an output that starts a vertical synchronising pulse at the predicted time. Also, in accordance with the present invention pseudo horizontal synchronising pulses, generated from horizontal synchronising pulses, may be provided when a video composite synchronising signal does not provide horizontal synchronising pulses when providing a vertical synchronising pulse.

This is achieved by extensive use of digital logic circuits to determine the duration of pulses in a video composite synchronising signal enabling horizontal and vertical synchronising pulses in a video composite synchronising signal to be identified and manipulated, thereby realising numerous advantages over methods employing analogue circuits. The advantages include lower power requirement and consistent circuit performance under varying operational conditions. In addition, as this method utilises digital circuitry, it may be advantageously integrated with other digital control circuitry into a single component package. In this way, the function of processing a video composite synchronising signal, and existing digital control functionality may be integrated into a single semiconductor chip. In addition, such a semiconductor chip advantageously reduces the complexity of manufacturing a video monitor and hence, reduces the manufacturing time, and increases reliability. Further, this invention produces a video monitor that prevents loss of horizontal synchronising pulses, supports multi-mode operation, and operates with equipment that do not provide horizontal synchronising pulses when providing a vertical synchronising pulse. Thus, the present invention improves enables a video monitor to be compatible with a variety of equipment, which substantially increases the commercial value of a video monitor.

Hence, the present invention enables processing of a VCSS in a video monitor that extracts the VSS without losing information employing digital circuitry. In addition the present invention ensures timing circuits in the video monitor are not adversely affected when HSS pulses are not included in the VCSS.

What is claimed is:

1. A method for providing a sequence of output pulses, the method comprising the steps of:
   (a) providing a first sequence of pulses to an output;
   (b) receiving an indication that the first sequence of pulses is terminated;
   (c) in response to step (b), providing a second sequence of pulses to the output wherein the second sequence of pulses is generated from the first sequence of pulses.

2. An apparatus for providing a sequence of output pulses, the apparatus comprising:
   a pulse generator having an input for receiving the first sequence of pulses, and an output for providing a second sequence of pulses, wherein the second sequence of pulses is generated from the received first sequence of pulses; and
   a switch for receiving a first sequence of pulses and coupled to the output of the pulse generator for receiving the second sequence of pulses, the switch coupled to an input select signal and an output, wherein the switch couples the first sequence of pulses to the output in response to the input select signal indicating the first sequence of pulses is not terminated, and couples the second sequence of pulses from the pulse generator to the output in response to the input select signal indicating the first sequence of pulses is terminated.

3. A method in a video monitor for providing an output sequence of horizontal synchronising pulses, the method comprising the steps of:
   (a) providing a sequence of received horizontal synchronising pulses to an output;
   (b) receiving an indication that the received horizontal synchronising pulses are terminated;
   (c) in response to step (b), providing pseudo horizontal synchronising pulses to the output, wherein the pseudo horizontal synchronising pulses are generated from the received horizontal synchronising pulses.

4. The method of claim 3 wherein step (b) comprises the step of receiving a signal indicating the start of a vertical synchronising pulse.

5. A video monitor comprising:
   an apparatus for providing an output sequence of horizontal synchronizing pulses, the apparatus comprising:
      a pseudo horizontal synchronizing pulse generator having an input for receiving a sequence of horizontal synchronizing pulses and an output for providing a sequence of pseudo horizontal synchronizing pulses, wherein the sequence of pseudo horizontal Synchronizing pulses is generated from the received sequence of horizontal synchronizing pulses; and
      a multiplexer for receiving a sequence of horizontal synchronizing pulses and coupled to the output of the pseudo horizontal synchronizing pulse generator for receiving the sequence of pseudo horizontal synchronizing pulses, the multiplexer coupled to an input select signal and an output, wherein the multiplexer couples the sequence of horizontal synchronizing pulses to the output in response to the input select signal indicating the sequence of horizontal synchronizing pulses is not terminated, and the multiplexer further couples the sequence of pseudo horizontal synchronizing pulses to the output in response to the input select signal indicating the sequence of horizontal synchronizing pulses is terminated.

* * * * *